E. KELLEY,
MOTOR FOR BEATERS,
APPLICATION FILED NOV. 22, 1919.
1,413,662. Patented Apr. 25, 1922.
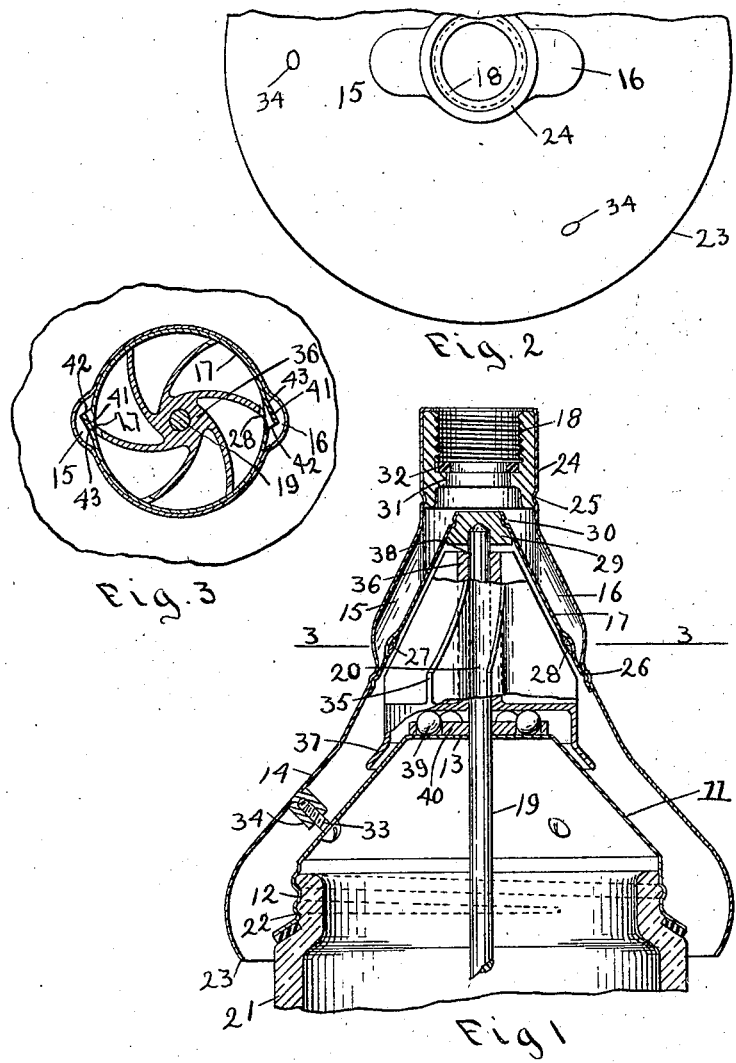
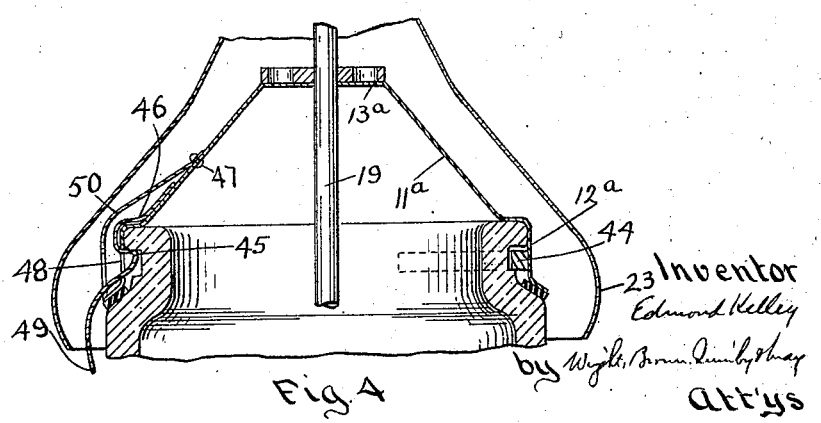

UNITED STATES PATENT OFFICE.

EDMOND KELLEY, OF BOSTON, MASSACHUSETTS.

MOTOR FOR BEATERS.

1,413,662. Specification of Letters Patent. Patented Apr. 25, 1922.

Application filed November 22, 1919. Serial No. 340,010.

*To all whom it may concern:*

Be it known that I, EDMOND KELLEY, a citizen of the United States, residing at Boston, in the county of Suffolk and State of Massachusetts, have invented new and useful Improvements in Motors for Beaters, of which the following is a specification.

This invention relates to a motive means for driving a beater or dasher by means of water or other fluid furnished under pressure; and specifically is a structural improvement in the device disclosed and claimed in my prior Letters Patent of the United States granted January 6, 1920, and numbered 1,327,395, entitled Hydropower beater. Such device or beater is particularly designed for domestic or kitchen use for the purpose of whipping cream, beating eggs, or stirring or mixing other materials used in the preparation of food; although the principles of the invention as embodied in the machine or motor may be applied to other various uses, wherefore I do not limit my claim to protection to any specific use or any specific proportions or dimensions.

My object in developing the present invention, in distinction from that disclosed in my prior patent above identified, has been to produce a machine having the essential characteristics and utility of the prior one, but constructed in a manner and according to principles enabling its manufacture commercially in large quantities to be carried out efficiently and economically. Accordingly it may be said that the invention consists in the mechanical and structural features contributory to that result in which the beating machine hereinafter described in detail differs from the original machine disclosed in said prior patent; and the invention further consists in the principles fundamental to such improved structure.

Referring now to the drawings annexed to this specification, Figure 1 is a view partly in sections and partly in elevation of the preferred form of my improved invention.

Figure 2 is a plan view of the same.

Figure 3 is a horizontal section on line 3—3 of Figure 1 showing the arrangement of rotor, waterways, and nozzle outlets from the latter.

Figure 4 is a sectional view of a modified form of means for securing the motor upon a jar or other container for the material to be beaten or stirred.

Like reference characters designate the same parts in all the figures.

The main parts of the motor attachment comprise a base 11 having a flange 12 and a bearing 13; a shield 14 having conduits or passageways 15 and 16; a conical wall 17 forming the inner boundaries of the passageways; a nipple 18; a shaft 19; and a rotor 20 mounted on the shaft, the whole being combined in a structural unit adapted to be mounted upon and dismounted from the open or mouth end of a jar 21, and to be secured by means of the nipple 18 to a faucet or other conduit supplying motive fluid. Preferably the base 11, shield 14, and cone 17 are made of sheet metal and spun, drawn, or otherwise formed, in the ways understood by sheet metal workers, to the desired shapes and proportions, substantially as indicated in the drawings.

Thus the base is essentially a cone frustum with its flange 12 cylindrical and formed with a screw thread 22 to fit a helical bead or thread surrounding the mouth of a jar and with a flat top 13 which provides a pedestal thrust bearing or support for the rotor, and is perforated for the passage of the shaft. The shield 14 is likewise substantially conical but at its base it is curved inward, providing a lip 23 of which the purpose is to prevent spattering of the exhaust water expended in driving the motor and to cause such exhaust water to flow against the outside of the jar to cool the same. At its upper end the shield is provided with a substantially cylindrical neck 24 which fits the outside of the nipple 18. It is secured to the latter either by a bead 25 which is indented into a groove in the nipple, or by soldering, welding, brazing, or the like, or both by the bead and by soldering, etc. The conduits or passageways or waterways 15 and 16 are formed preferably by offsetting outwardly the material of the shield along lines running from the tubular neck a sufficient distance toward the base of the shield, either straight along the elements of the cone surface or spirally, but preferably straight. The inner wall 17 is likewise conical and fits the interior of the shield within that zone thereof which includes the entire length of the passageways. Its base extends beyond the lower ends of the passageways and is secured to the inner surface of the shield, preferably by means of a matching bead 26 formed both in the shield and in the inner wall, but permissibly also, or exclusively, by soldering, brazing, welding, or other means. Said inner wall 17 is thus a liner which forms the inner confining boundary of the passages or waterways and is provided with openings 27 and 28, suitably formed and arranged to direct jets of the water or other impelling fluid against the rotor vanes.

The small end of the inner wall member or liner 17 extends toward the nipple 18 and contains a bearing block 29 to which it is secured by a bead 30 or by soldering, brazing, welding, etc.; such block providing a step bearing for the upper end of the shaft.

There may be one, two, or more of the passageways previously described, the number being limited only by the available space and the capacity of the metal forming the shield for distortion by offsetting. Two is the preferable number, however, because the passageways can then be set diametrically opposite to each other to discharge oppositely impinging jets, and effectively balance the impulses applied to the motor, and because two jets so arranged furnish sufficient power to run the motor under the pressure at which the domestic water service is customarily supplied to dwellings. However, instead of defining the passageways by offsetting part of the shell and providing an interior wall member, I may form them by attaching tubes or conduits, either completely enclosed or open along one side, upon the outside of the shield and cutting through the shield at the ends or along the entire length of such conduits to provide for ingress and egress of water.

The nipple may be any sort of internally threaded pipe fitting, specially made or such as can be obtained on the market, and having an internal shoulder 31 to support a packing washer 32. When screwed upon a threaded faucet or pipe end or other coupling it is rigidly held and rigidly supports the motor structure. Rigid connection likewise is made between the base and the shield by means of a sufficient number of screws 33 and threaded socket members 34, which receive the screws. These socket members are preferably secured to the interior of the shield while the screw shanks pass through the adjacent wall of the base and their heads lie on the inside of said wall, for this manner of attachment may be effected without causing the connection to appear on the outside of the shield, although structurally equivalent results would be secured if the arrangement were reversed. For thus securing the socket members they are provided with reduced ends which pass through holes in the shield and are upset, in the manner of rivets, and finished off flush with the outer surface of the shield; although they may be soldered, brazed, welded, or otherwise attached to the shield or, conversely, to the base.

Thus the structural parts hereinbefore described are made into a unit frame or casing which contains the rotor and is adapted to be mounted on a jar and to be suspended from a pipe connection, suspending the jar also.

The rotor is housed in the conical space between the bearing or pedestal part 13 of the base and the lining member 17. It is provided with vanes 35 and a tubular hub 36 which fits removably upon the shaft, and likewise with a skirt 37 which surrounds the upper part of the base and the interposed bearing, excluding water therefrom and from the hole in the pedestal part through which the shaft passes. Preferably the rotor is made as a casting. It is secured to the shaft by a locking ring seated partly in a groove in the shaft and partly in a recess in the rotor hub, or by an integral lip 38 offset from the end of the hub into such groove, although if desired it may be screwed upon the shaft. A ball bearing consisting of a series of balls 39 in a ball retainer 40 is seated upon the top of the pedestal or bearing surface of the base and beneath the rotor, which latter rests upon the balls.

Water or other fluid admitted through the nipple to the passageways issues from the nozzle orifices 27 and 28 against the rotor vanes and the jets so issuing drive the latter; but in order to drive the rotor effectively the jets must travel in a direction generally tangential to the rotary path of the vanes, and in order to form in a sheet metal shell nozzles capable of thus directing jets thus tangentially, I offset the metal of the conical liner outwardly at the nozzle locations to form salients 41 as shown in Figure 3, the outer sides of which salients have approximately the tangential direction desired for the jet, and the orifice is cut through or cut out of the wall at the adjacent side or end 42 of the salient. If desired the wall of the liner member in the part 43 adjacent to the entrance of the nozzle may be indented, but such inward offsetting can not be permitted to extend a great distance because the edges of the rotor vanes are designed to travel close to the liner. It is apparent that the water passages extend far enough to bring the nozzles near the base of the rotor, that is, where the circumference of the latter is approximately the greatest in order to utilize the velocity of the impelling jets with the greatest mechanical efficiency.

The construction of base hereinbefore described adapts the motor to be mounted upon a screw top jar. In Figure 4 is shown a construction of base, otherwise the same as that already described, and adapted to be combined with the other structural and operative parts in the same way, but adapted to be secured on a jar having an outer lip or bead but no screw thread. The parts of such base corresponding to the base 11 are designated 11ª, 12ª, and 13ª, respectively. Instead of the flange 12ª having a helical bead or thread there is secured to it on the inner surface a curved bar 44, forming a ledge and at the opposite side of the base is mounted a latch 45, the same being conveniently made as a strip of springy sheet metal 46 secured at one end by a rivet 47 to the base, bent around the flange, inwardly through a notch 48 in the side of the base, and then sharply downward to form a latching shoulder, and continuing to furnish a handle part 49 by which it may be withdrawn. A housing 50 is secured to the base 11ª to guard the latch.

It it evident, of course, that the water entering through the nipple at the top flows directly through the water ways and issues in jets from the nozzle orifices, driving the rotor, and that the exhaust then escapes through the conical annular space between the base and the shield. Functionally there is an advantage in the conical form of the base with its relatively steep pitch and absence of horizontal surfaces or abrupt obstructions of any appreciable magnitude, in that thereby the waste water escapes freely without possibility of backing up and so overflowing the bearing and running down the shaft into the container. For the rest, the construction is of such character that the parts may be produced at low cost either for material or labor and assembled at low cost.

What I claim and desire to secure by Letters Patent is:

1. A motor for a beater comprising substantially conical inner and outer members forming respectively a base and a shield and being secured together with a conical annular space between them, a rotor situated within the shield above the base, passageways arranged exteriorly on the shield arranged to direct jets against the rotor, a nipple for attachment to a conduit secured to said shield and communicating with the entrance ends of said passageways, and a shaft secured to the rotor.

2. A motor device comprising a sheet metal outer cone having an offset part forming a passageway, a liner fitting and secured within that part of the cone from which said offset part springs and forming the inner wall of the passageway, a base secured within the base part of said cone and spaced apart therefrom, having a pedestal part at its upper end, a rotor supported on said pedestal part and occupying the interior of said liner, and a shaft secured to the rotor the liner having a nozzle orifice arranged to direct fluid from said passageway in a tangential direction upon the rotor.

3. A motor attachment comprising a substantially conical base having means for attachment over the open mouth of a jar and having a pedestal bearing part, an outer shell surrounding and spaced apart and secured to said base and being contracted in width toward its upper end, a rotor mounted upon said pedestal part within the contracted upper part of said outer shell, an external fluid passageway on the upper part of the shell having a nozzle orifice arranged to direct a jet upon said rotor, and a coupling member attached to the outer shell and having an internal opening in communication with said passageway.

4. A motor attachment consisting of a substantially conical sheet metal outer shell having a tubular neck at its apex and offset outwardly to provide a passageway running from said neck part way toward its base, a substantially conical sheet metal liner fitting within the zone of said outer shell in which said passageway is formed, secured substantially fluid tight therein and providing the inner wall of said passageway and having an opening formed to direct a jet from the passageway tangential to a circle within the liner, a substantially conical sheet metal base secured within the base part of the shell and spaced apart therefrom on all sides, having a flange equipped with means for attachment to a container, the upper end of said base formed as a pedestal or thrust bearing, a rotor constructed with vanes supported in the liner upon said pedestal and shaped to occupy when rotating substantially the entire space within the liner and above the pedestal, and a shaft connected to the rotor.

5. A motor attachment consisting of a substantially conical sheet metal outer shell having a tubular neck at its apex and offset outwardly to provide a passageway running from said neck part way toward its base, a substantially conical sheet metal liner fitting within the zone of said outer shell in which said passageway is formed, secured therein in a substantially fluid tight manner and providing the inner wall of said passageway and having an opening formed to direct a jet from the passageway tangential to a circle within the liner, a substantially conical sheet metal base secured within the base part of the shell and spaced apart therefrom on all sides, having a flange equipped with means for attachment to a container, the upper end of said base formed as a pedestal or thrust bearing, a rotor constructed with vanes supported in the liner upon said pedestal and shaped to occupy when rotating substantially the entire space within the liner and above the pedestal, and a shaft connected to the rotor, the rotor having a skirt overhanging the upper part of said base to deflect the motive fluid from said upper part.

6. A motor for a rotary beater having a central hub, a base, and vanes extending outward from the hub over the base, a shaft passing through the hub of said rotor and secured therein, a base having an elevated pedestal portion, continuously inclined sides and a bottom flange, an outer shell surrounding said base and rotor and secured to the base but spaced apart therefrom, an external passage on the outer part of the outer shell having a discharge nozzle directed tangentially against the rotor, and a coupling nipple in communication with the passageway.

7. In a motor of the character set forth an outer casing or shell contracted in diameter at its upper end to a tubular neck and having an outwardly offset passageway running from said neck toward its base, and a liner fitting and secured within that part of the shell from which the offset walls of the passageway spring and providing the inner wall for said passageway, said liner having a perforation communicating with the passageway to form a jet orifice and a part of the material of the liner being offset outwardly to provide the outer boundary of said orifice and to form a wall guiding the jet issuing from the orifice in a generally tangential direction.

In testimony whereof I have affixed my signature.

EDMOND KELLEY.